United States Patent

[11] 3,604,909

[72] Inventors Heinz Vogel; Hubert Eing, both of Constance, Germany
[21] Appl. No. 731,806
[22] Filed May 24, 1968
[45] Patented Sept. 14, 1971
[73] Assignee Telefunken Patentverwertungsgesellschaft m.b.H. Ulm (Danube) Germany
[32] Priority May 24, 1967
[33] Germany
[31] T-33931

[54] MODULAR UNIT FOR DIGITAL ARITHMETIC SYSTEMS

7 Claims, 7 Drawing Figs.

[52] U.S. Cl. .......... 235/175, 235/164, 340/146.2
[51] Int. Cl. .......... G06f 7/50, G06f 7/52
[50] Field of Search .......... 235/175, 164; 340/172.5, 146.2

[56] References Cited

UNITED STATES PATENTS

| | | | |
|---|---|---|---|
| 3,226,688 | 12/1965 | Amdahl et al. .......... | 340/172.5 |
| 3,296,426 | 1/1967 | Ball .......... | 235/175 |
| 3,364,472 | 1/1968 | Sloper .......... | 340/172.5 |
| 3,393,304 | 7/1968 | Dell et al. .......... | 235/175 X |

*Primary Examiner*—Malcolm A. Morrison
*Assistant Examiner*—David H. Malzahn
*Attorney*—Spencer & Kaye

ABSTRACT: A modular logic unit consisting of a plurality of identical logic elements interconnected to perform a large variety of arithmetic operations which fully utilize the logic elements so as to make efficient use of the logic elements and to maintain the cost of such unit at a minimum. An arithmetic unit composed of a plurality of such modular units and a plurality of associated storage registers, there being one modular unit associated with each bit location of the storage registers.

INVENTORS
Heinz Vogel &
Hubert Eing
BY Spencer & Kaye
ATTORNEYS

INVENTORS
Heinz Vogel &
Hubert Eing
BY Spencer & Kaye
ATTORNEYS

INVENTORS
Heinz Vogel &
Hubert Eing

BY Spencer & Kaye
ATTORNEYS

INVENTORS
Heinz Vogel &
Hubert Eing
BY Spencer & Kaye
ATTORNEYS

MODULAR UNIT FOR DIGITAL ARITHMETIC SYSTEMS

BACKGROUND OF THE INVENTION

The present invention relates to a modular logic unit consisting of electronic switching means and having four inputs each one of which receives an operand consisting of binary electrical signals and four outputs for such signals.

In the construction of complex electronic digital circuits for use, for example, in the electronic computer art, it is highly desirable, if not absolutely necessary, for reasons of economy and to permit more standardized systems engineering procedures, to limit the number of different modular units, a modular unit being a group of basic logic elements combined into a functional unit.

The limitation on the total number of different types of modular units which would satisfy the requirements of any computing system is, however, restricted at the lower end by economic considerations because as the number of functions which one modular unit can perform increases, its utilization factor generally decreases.

SUMMARY OF THE INVENTION

It is a primary object of the present invention to substantially reduce these drawbacks and difficulties.

Another object of the invention is to substantially reduce the cost of modular units having a highly flexible operation.

Yet another object of the invention is to substantially reduce the number of different elements required for such a modular unit.

Yet a further object of the invention is to make maximum use of the logic elements of a modular unit in the performance of various logic operations.

Still another object of the invention is to simplify the structure of such modular units.

These and other objects according to the invention are achieved by the provision of a modular logic unit composed of a plurality of identical logic elements interconnected to have four inputs, X, Y, Z, and *c* each arranged to receive one binary bit having a value of "1" or "0," and four outputs R, S, T and C. The elements are interconnected for causing the output R to present a binary "1" only when the modulo-2 sum of the bits delivered to inputs X, Y and Z is a binary "1," output S to present a binary "1" only when the modulo-2 sum of the bits delivered to all four inputs is a binary "1," the output T to present a binary "1" only when the bits delivered to at least two of the inputs X, Y and Z have a value of "1," and output C to present a binary "0" only when a binary "0" appears at each of the inputs X, Y and Z, or a binary "1" appears at only one of the four inputs, ora binary "1" appears only at each of the inputs X, Y and Z.

The objects according to the invention are also achieved by the provision of an *n*-bit arithmetic unit composed of a plurality of such logic units, with each of the logic units being associated with a respective bit location of the arithmetic unit.

The present invention therefore provides a modular unit which has particularly favorable properties especially when used as a circuit component in a digital computer, which circuit component can be constructed without increased expenditures while being capable of performing any one of a plurality of diverse functions.

The unit according to the invention further makes possible the performance of a rapid succession of multistate functional steps.

BRIEF DESCRIPTION OF THE DRAWINGS

In all of the figures the same components bear identical reference numerals.

DESCRIPTION OF THE PREFERRED EMBODIMENTS

Figure 1:
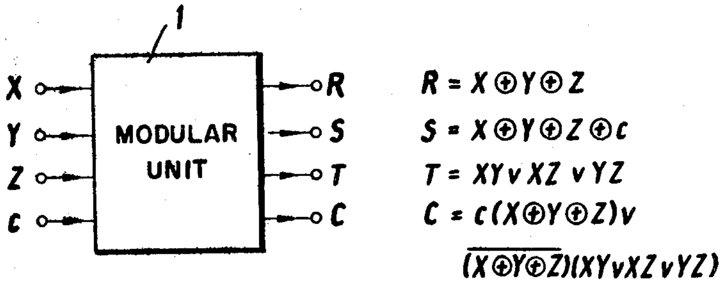
FIG. 1 is a block diagram of the modular unit of the present invention and a representation of its functions.

FIG. 1 shows a basic logic modular unit 1 according to the invention. It has four inputs Y, Z and *c* and four outputs R, S, T and C. The binary input and output signals of the modular unit 1 might be identified according to the terminals (inputs or outputs) at which they appear. Thus, the logic description of the operation of the modular unit 1 can be stated as follows:

$$R = X \oplus Y \oplus Z$$

$$S = X \oplus Y \oplus Z \oplus c$$

$$T = (X \cdot Y) \vee (X \cdot Z) \vee (Y \cdot Z)$$

$$C = c \cdot (X \oplus Y \oplus Z) \vee \overline{(X \oplus Y \oplus Z)} \cdot (X \cdot Y \vee X \cdot Z \vee Y \cdot Z)$$

where: $\oplus$ represents a modulo-2 addition (e.g. $a \oplus b = \bar{a} \cdot b \vee a \cdot \bar{b}$);

$\vee$ represents a disjunction, or OR function, and is equivalent to the symbol "+" commonly used in the computer field;

the "·" represents a conjunction or AND function, and is equivalent to the symbol "*x*"; and a bar over a term is the logic representation of a negative, or NOT function.

The modular unit producing the above combination of the four functions for R, S, T and C according to the present invention makes possible a plurality of operations which will be individually described below in connection with the drawings together with their advantageous interaction within the framework of the present invention.

Figure 2:
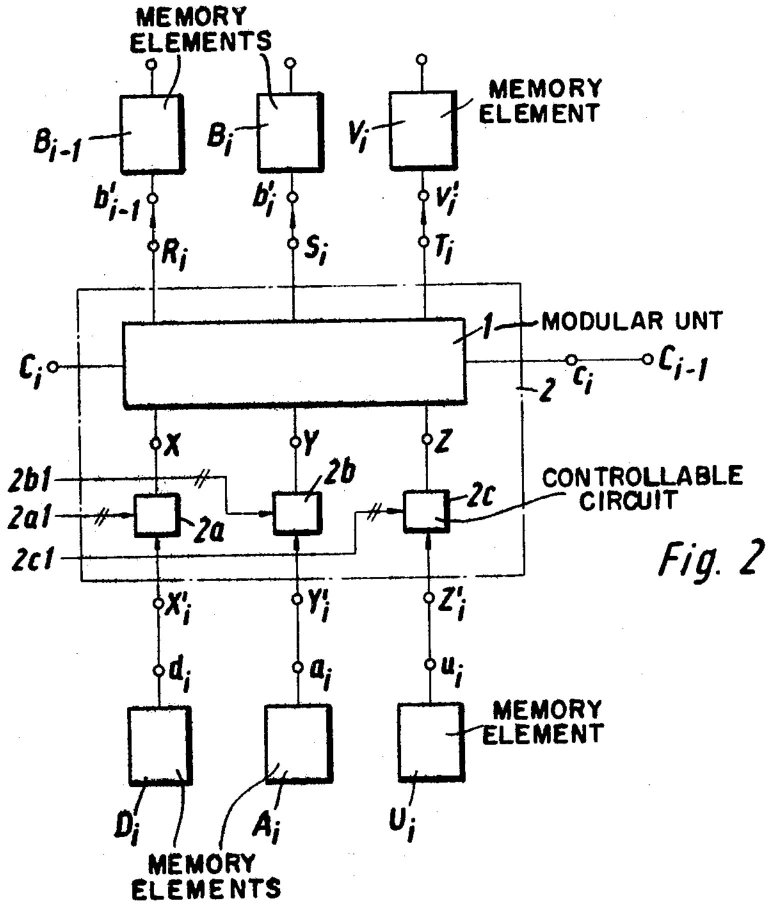
FIG. 2 is a block diagram of one system employing the modular unit according to FIG. 1.

In FIG. 2 the modular unit 1 is augmented by three controllable circuits 2*a*, 2*b* and 2*c* to constitute a unit 2 having the inputs $X'_i$, $Y'_i$, $Z'_i$ and $c_i$, the subscript *i* indicating that this is the *i*th stage of a multistage assembly. Each one of the controllable circuits has an input, an output and two control inputs. The input of circuit 2*a* is connected to the input $X'_i$ of the unit 2 and its output to the input X of the modular unit 1. Similarly, the two circuits 2*b* and 2*c* are disposed between the inputs $Y'_i$ and Y or $Z'_i$ and Z, respectively. Control signals are applied to the control inputs of each of the above-mentioned circuits via a respective double line 2*a*1, 2*b*1 or 2*c*1, each shown here as a single line, in response to which they either transfer the offered input signal, either directly or inverted, to the modular unit 1, or they transmit a logic 0 to 1 signal, independent of the input signal. Thus, the use of primes herein only indicates that an output can be, but is not necessarily, different from its associated input. This arrangement therefore permits the operands which are to be combined to be presented to the modular unit either directly or in inverted form, or permits individual ones of the inputs X, Y and Z to be set to 0 to 1. The input $c_i$ is identical with the input *c* of FIG. 1.

The input $X'_i$ of unit 2 is connected to the output $d_i$ of a memory element $D_i$. The input $Y'_i$ is similarly connected to the output $a_i$ of a memory element $A_i$, and the input $Z'_i$ is connected to the output $u_i$ of a memory element $U_i$. At the other side of the unit, the output $R_i$ is connected to the input $b_{i1}$ of a memory element $B_{i1}$, the output $S_i$ is connected to input $b_i$ of a memory $B_i$, and the output $T_i$ is connected to the input $v'_i$ of a memory element $V_i$. The outputs $R_i$, $S_i$ and $T_i$ are identical with the outputs R, S, and T of FIG. 1.

In the following description, the designation of the output of a memory element simultaneously indicates its contents, i.e., the operand stored therein. Memory element $B_{i1}$ thus receives the modulo-2 sum of $d_i$, $a_i$ and $u_i$, memory element $B_i$ receives the modulo-2 sum of $d_i$, $a_i$, $u_i$ and $c_i$, and memory element $V_i$ is set to 1 when the function $T = a_i \cdot d_i \vee d_i \cdot u_i \vee a_i \cdot u_i$ is satisfied, or true. If one of the inputs X, Y or Z is 0, a conjunction, i.e., an AND function, is formed, via output $T_i$, between the other two interconnected input memory element contents, e.g. if $Y=0$, $T_i=d_i \cdot u_i$, and by setting the same input to 1 their disjunction or OR function is formed, e.g. if $Y=1$, $T_i=d_i \vee u_i$.

If at least one of the three operands $d_i$, $a_i$ and $u_i$ is made ineffective by means of the circuits 2*a*–2*c*, the respective circuit will emit a signal representing 0 and the output $C_i$ will furnish the carryover and the output $S_i$ the sum, of a dual addition between the addends $d_i$, $a_i$ and $c_i$, or $d_i$, $u_i$ and $c_i$, or $a_i$, $u_i$ and $c_i$. The addend $c_i$ can then be the carryover $C_{i-1}$ from another digit, or bit location, of a multidigit addition.

It is thus possible to add three operands with the modular unit 1 according to the present invention as long as it is assured that one of the three operands is 0. This condition can be met for example, by means of the circuits 2*a*–2*c* or, in an electronic computer, by an appropriate program.

The output $T_i$ emits, in such an operation, a carryover for one particular bit, i.e., the carryover from the addition of the two addends without being affected by the carryover from another bit location which has been brought in via input $c_i$.

When the condition is met that two of the three inputs X, Y and Z are held at 0, via the circuits 2*a*–2*c*, transfer operations can be performed via output $R_i$. For example, the memory element $B_{i-1}$ will accept the contents of memory element $A_i$ when the outputs of circuits 2*a* and 2*c* are held at logic 0 by their respective control lines 2*a*1 and 2*c*1, and when circuit 2*b* is set to transfer without inverting its input.

It is further possible, by means of the modulo-2 addition, to perform coincidence tests between two operands.

Figure 3:
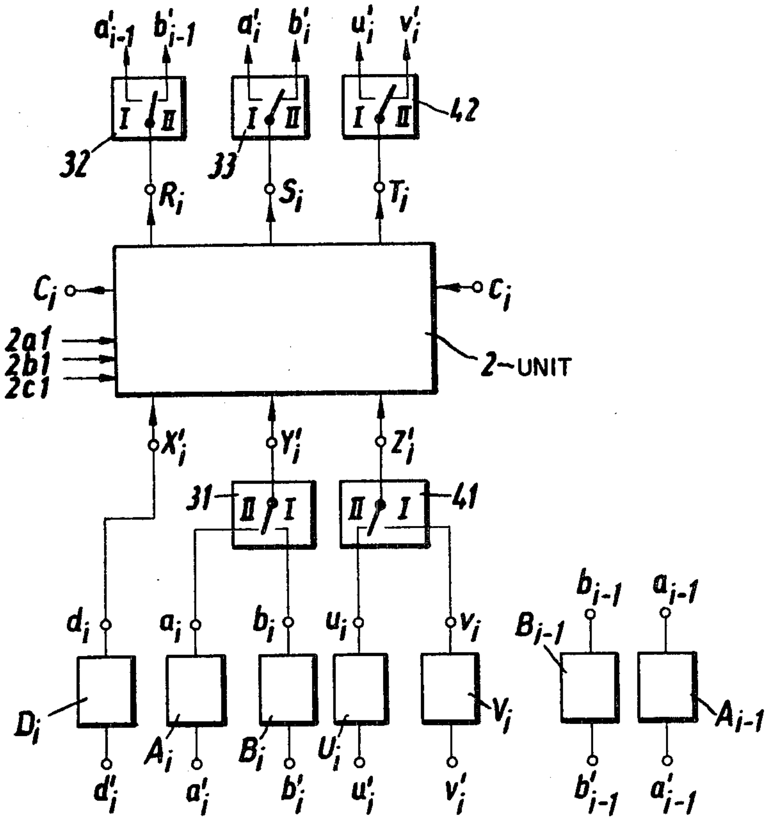
FIG. 3 is a block diagram of a modified version of the arrangement according to FIG. 2.

In order that, during multistage arithmetic or combining operations, the contents of the memory elements $B_{i-1}$, $B_i$ and $V_i$, which contents constitute the results of the respective previous operations, need not, before any further operation is initiated, be first transferred into the memory elements $D_i$, $A_i$ and $U_i$, which latter elements are in communication with the inputs $X'_i$, $Y'_i$ and $Z'_i$ of unit 2, an arrangement is provided, as shown in FIG. 3, for the memory elements, except for $D_i$, to be connected selectively either via their inputs or via their outputs to the unit 2.

It is particularly possible to connect the output of either one of the memory elements $A_i$ and $B_i$, via a switch 31, to the input $Y'_i$. The output $R_i$ is selectively connected, via a switch 32, either to input $b'_{i-1}$ of memory element $B_{i-1}$ or to the input $a'_{i-1}$ of a memory element $A_{i-1}$, and output $S_i$ is selectively connected, via a switch 33, either to the input $a'_i$ of memory unit $A_i$ or to the input $b'_i$ of memory unit $B_i$.

The switches 31–33 are switched simultaneously, and in the same direction, so that it will never occur that one memory element is simultaneously connected to both an input and an output of unit 2. Correspondingly, memory elements U and V can have their respective outputs $u_i$ and $v_i$ connected to the input $Z'_i$, via a switch 41, and their respective inputs $u'_i$ and $v'_i$ connected to the output $T_i$ of unit 2 via a simultaneously operated switch 42.

Switches 31–33, 41 and 42, as well as circuits 2*a*1, 2*b*1 and 2*c*1, are preferably controlled, when unit 2 is used in a digital computer, by a suitable microprogram control unit.

Figure 4:
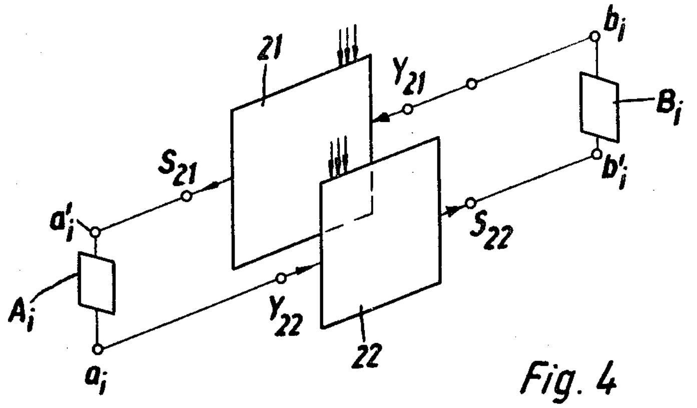
FIG. 4 is a simplified diagram illustrating a portion of another modification of the arrangement according to FIG. 2.

The above-mentioned switches are preferably electronic switches which, when used in fast-acting switching circuits, have a signal transmission delay time which is not negligible. This is added to the signal transmission delay time of unit 2. If the effect of the signal delay times due to the switches are to be eliminated, an arrangement of the type shown in FIG. 4 must be employed. It consists of two identical units 21 and 22, each corresponding to a unit 2, of the type shown in FIG. 2 with the memory elements shown there. However, to simplify the illustration only memory element $A_i$ and $B_i$ are shown here. For the same reason only one of the inputs, i.e. $Y'_{21}$ or $Y'_{22}$, respectively, and one of the outputs $S_{21}$ or $S_{22}$, respectively, are shown at each unit. The output $S_{21}$ of unit 21 leads to input $a'_i$ of memory element $A_i$, output $a_i$ of this memory element leads to input $Y'_{22}$ of unit 22, the output $S_{22}$ of unit 22 is connected to input $b'_i$ of memory element $B'_i$ and the output $b_i$ of element $B'_i$ leads to input $Y'_{21}$ of unit 21. In a multistage combining process, units 21 and 22 are activated alternately and, correspondingly, the respective intermediate results are stored alternatingly in memory elements $A_i$ and $B_i$. Activation of both units occurs via their respective control lines, here represented by sets of three arrows.

Before the circuit unit of FIG. 3 is further described, a register word will be defined: A register word may be the contents $a_n,\ldots, a_i, a_{i-1},\ldots a_0$ of an operand register A consisting of register elements $A_n,\ldots, A_i, A_{i-1},\ldots,A_0$. If the bits of the register word are weighted, $a_0$ will have the lowest value and $a_n$ the highest. Correspondingly, the memory elements in FIGS. 2 and 3 can each be a register element of an operand register. $D_i$ is then, in particular, the *i*th register element of an operand register D, $A_i$ is the *i*th register element of an operand register A, etc., $A_{i-1}$ is the $(i-1)$th register element of operand register A and $B_{i-1}$ is the $(i-1)$th register element of operand register B. Unit 2 accordingly becomes the *i*th arithmetic circuit of an *n*-digit arithmetic unit.

It should here be particularly noted that output $R_i$ differs from the other outputs in that it does not lead to the inputs of the *i*th register elements, but rather to those of the ($i-1$th register elements. Thus, the result appearing at $R_i$ is shifted to the right by one digit, or bit location, and is transferred into one of the operand registers A or B, respectively. If the result appearing at $R_i$ is merely the contents of an operand register connected to its input, a register shift to the right by one bit location will thus occur.

Figure 5:
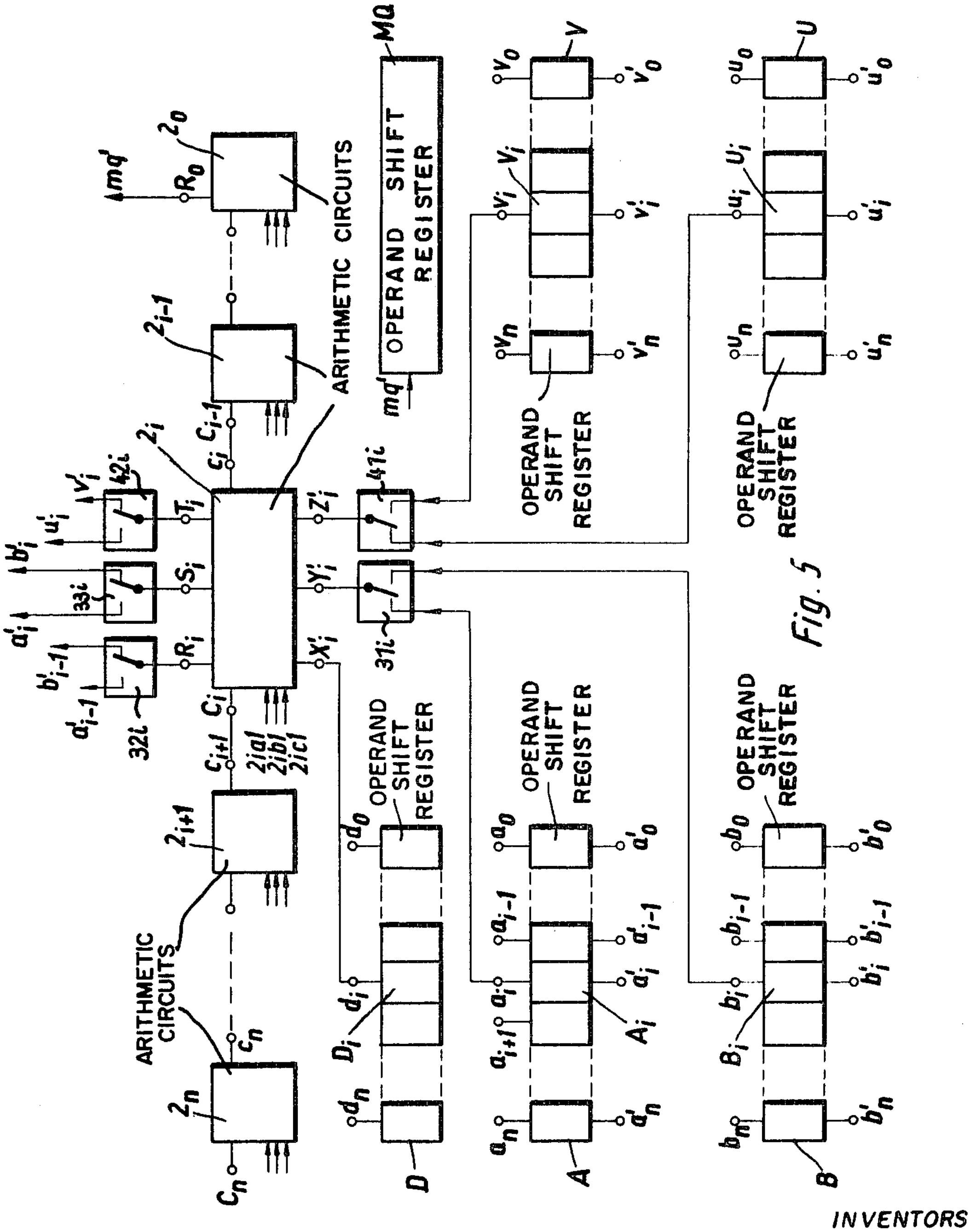
FIG. 5 is a simplified block diagram of an arithmetic unit constructed of modular units according to the present invention.

A complete arithmetic unit based on the circuitry of FIG. 3 is shown in FIG. 5. While the circuit of FIG. 3 was described as the *i*th arithmetic circuit of an arithmetic unit, the arithmetic unit shown in FIG. 5 is constituted by a plurality of the circuits of FIG. 3.

The arithmetic unit consists of $(n+1)$ arithmetic circuits $2_n,\ldots, 2_{i+1}, 2_i, 2_{i-1},\ldots, 2_0$, one for each word bit location, with a set of switches $31_i$, $32_i$, $33_i$, $41_i$, and $42_i$ associated with each bit location. For purposes of clarity, however, only the switches of the *i*th digit are shown as is their connection to the *i*th register element of each of the operand registers D, A, B, V and U. A further, shiftable operand register MQ is provided whose shift input *mg'* is connected to the output $R_0$ of the unit $2_0$. Particularly during a computation involving double word length results, e.g. during multiplication, the operand register MQ will accept one-half of the double word length result.

In order to assure that the register elements of the operand registers A and B will not be simultaneously controlled by two arithmetic circuits, e.g. the register element $a_i$ by $S_i$ and $R_{i+1}$, two further switching means are preferably provided by which the outputs $R_i$ and $S_i$ of each unit $2_i$ can be interconnected or disconnected. These switching means, however, are not shown in FIG. 5.

The functions described for the circuits of FIG. 1 to 3 are also applicable for the arithmetic unit of FIG. 5. The latter makes possible the conjunctive digital combination of the contents of two registers, which is significant, for example, for mask operations, and it also makes possible the disjunctive digital combination, the modulo-2 sum, between 1 to 3 register contents and the formation of the dual sum (outputs S) between the contents of three operand registers. In this latter case, provision must be made, by means of macro- or microprogramming measures, for example, that the contents of one of the three operand registers, either for each bit location or entirely, must always be 0.

The advantageous utilization of the R and T outputs, in particular, results in a multiplication procedure which is favorable with respect to the requirements of the microprogram and to time.

Several basic computing operations as performed by an arithmetic unit according to the invention will now be described by way of example.

MULTIPLICATION

Multiplication is performed in the conventional manner as far as the basic procedure is concerned, i.e., in any *i*th multiplication step, the multiplicand is added or not added, depending on whether the *i*th bit of the multiplier is a 1 or a 0, to the result of the preceding multiplication step, after the latter result has been shifted one bit location to the right. Furthermore, the multiplicand, in a known manner, remains unchanged in one operand register (here in the operand register (D) during the entire multiplication process and the multiplier in the shiftable operand register MQ (multiplicand-quotient register) is reduced by one bit with each multiplication step whereas the right portion of the ultimate double word length product is built up therein in the same manner.

A preferred multiplication procedure according to the present invention is achieved according to the following sequence:

$$o\text{th step } m_0\cdot\langle D\rangle,\langle A\rangle,\langle V\rangle^{R\rightarrow B}_{T\rightarrow U}$$

$$1\text{st step } m_1\cdot\langle D\rangle,\langle B\rangle,\langle U\rangle^{R\rightarrow A}_{T\rightarrow V}$$

.

.

.

$$k\text{th step } m_k\cdot\langle D\rangle,\langle A\rangle,\langle V\rangle^{R\rightarrow B}_{B\rightarrow U}$$

.

.

.

$$n\text{th step } m_n\cdot\langle D\rangle,\langle B\rangle,\langle U\rangle^{R\rightarrow A}_{T\rightarrow V}$$

$$(n+1)\text{th step } U\cdot\langle D\rangle,\langle A\rangle,\langle V\rangle^{R\rightarrow B}_{T\rightarrow U}$$

where:

$m_k$= $k$th digit of the multiplier (which determines the signals on control lines 2a1)

<>= contents of one operand register, such as <D> equals content of operand register D, etc.

$\underrightarrow{R}$= The intermediate results at the R outputs of the arithmetic unit are shifted one bit location to the right, except for the value at $R_0$, and is transferred into the operand register listed to the right of this symbol, i.e., in step 0 it is shifted into the operand register B, in step 1 into A.

$\underrightarrow{T}$= The partial intermediate results at the T-outputs of the arithmetic unit are transferred to the operand register listed to the right of the symbol.

These steps may be described more fully as follows:

At the beginning of a multiplication process, the contents of operand registers A, B, V and U are set to zero.

0 Step

The multiplicand <D> is applied to the X' inputs of the arithmetic unit when the lowest-valued digit $m_0$ of the multiplier equals 1. The outputs of the operand register A are connected to the Y' inputs and the outputs of operand register V are connected to the Z' inputs. The values derived therefrom are transferred, as described above, to the operand registers B and U. The values $R_i$ here form the dual digital sums, and the values $T_i$ the digital carryovers of the input operands. These carryovers are considered in the next (first) step.

First Step

Depending on $m_1$, the operand register D is connected to the X' inputs. The operand register B is now connected to the Y' inputs, the operand register U to the Z' inputs. The operand register A is connected to the R outputs, the operand register V to the T outputs. Due to the register change, the original output registers have now become input registers and vice versa (with the exception of D). In this step, the carryovers from the preceding step are also taken into consideration.

($n$+1)th Step

In this step, only the carryovers from the $n$th step are being computed.

The above-described multiplication procedure fully utilizes the advantages of the arithmetic unit according to FIG. 5. The shift pulse required after each addition in the known arithmetic units is eliminated and the addition periods are reduced, due to the elimination of the time otherwise required for the circulating carryovers (the sum outputs $S_i$ and carryover outputs $C_i$ are not being used), to the switching time of the $2_i$ units and the other required transfer times.

DIVISION

Division is accomplished according to the known subtraction method in which a 1 is entered into the quotient when the difference becomes positive after subtraction of the divisor from the intermediate remainder. It is known to accomplish this procedure in such a manner that the divisor is again added to a negative difference and the thus resulting sum is multiplied by 2 (shift to the left) and serves as minuend in the next stage of the multiplication process. In the arithmetic unit shown in FIG. 5, however, the negative difference which can be recognized from the presence or nonpresence of the carryover $C_n$ is not transferred by the arithmetic unit into an operand register. Rather, the still existing minuend which leads to ta negative difference (e.g. present in operand register A or B) is immediately shifted by one register (multiplication by 2) and the next subtraction is initiated (next arithmetic step). In this manner, the time required in the known division process to recover the minuend when negative differences occur is saved.

Figure 6:
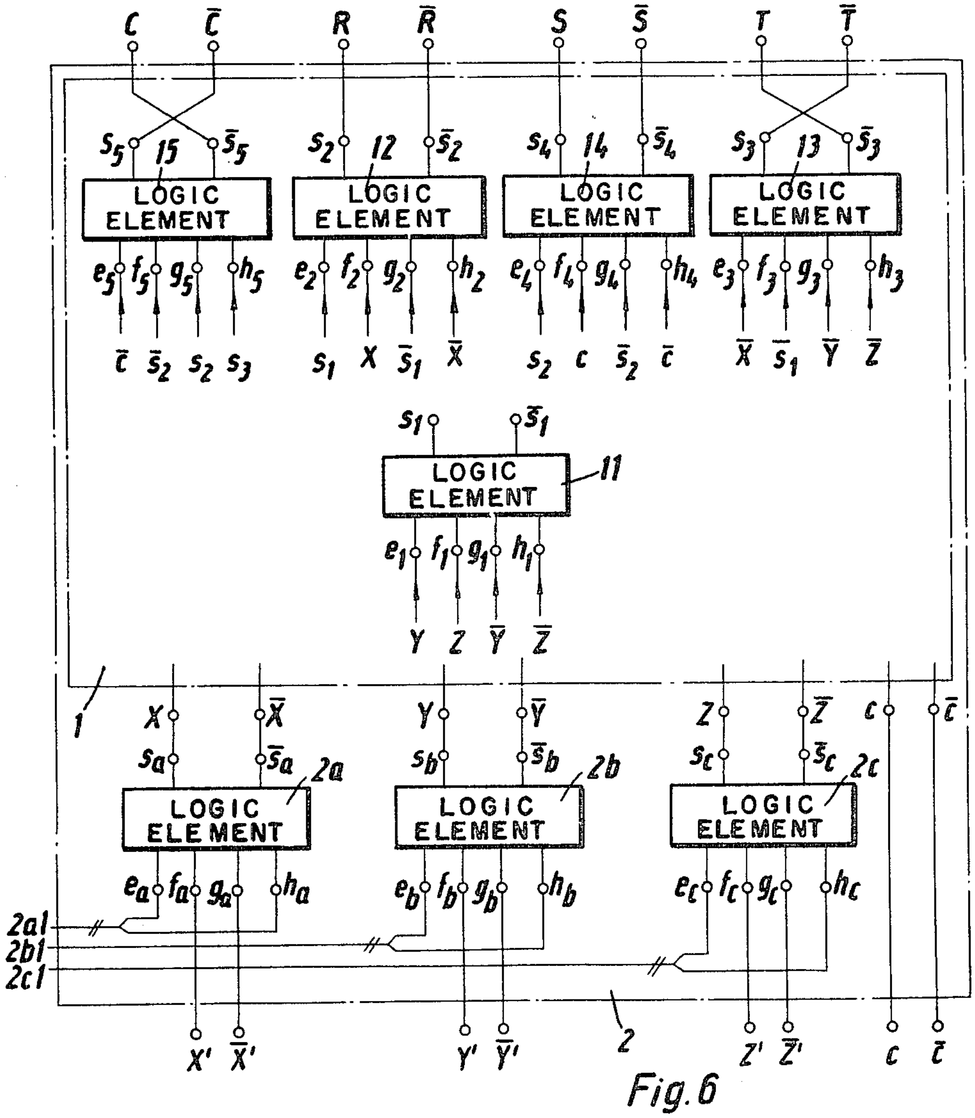
FIG. 6 is a block diagram of one preferred embodiment of the modular unit according to the invention.

FIG. 6 shows a practical embodiment of a modular unit according to the present invention as illustrated in FIG. 1 and of the unit 2 according to the present invention as illustrated in FIG. 2. The modular unit 1 consists of five identical known logic elements 11, 12, 13, 14 and 15.

Each logic element has four inputs $e$, $f$, $g$ and $h$ and two outputs $s$ and $\bar{s}$. The output signals are related to the input signals as follows:

$$\bar{s}=(e\vee f)\cdot g\vee h)$$

and $$\bar{s}=\bar{e}\cdot\bar{f}\vee\bar{g}\cdot\bar{h}$$

If the negated values of the input variables present at inputs $e$ and $f$ of one logic element are applied to inputs $g$ and $h$, respectively, the element serves as a half adder (modulo-2 addition), e.g., $s=(X\vee Y)\cdot(\bar{X}\vee\bar{Y})=X\bar{Y}\vee\bar{X}Y$; correspondingly, $\bar{s}=\bar{X}\cdot\bar{Y}\vee XY$.

These different logic possibilities are fully utilized in the circuit of FIG. 6. Thus, the logic element 11 provides the modulo-2 sum between Y and Z. This sum, as well as the input value X, is added to the logic element 12 which furnishes at its output the modulo-2 sum of all three input values X, Y and Z, which is then transferred to the output R. The logic element 14, in the same manner, receives as one input value the output value from the logic element 12 and as a second input variable the value $c$, which it adds by modulo-2 addition to produce the dual sum S. To the input of logic element 13 the negated values of input values X, Y, Z are applied as $\bar{X}$, $\bar{Y}$ and $\bar{Z}$ as well as the negated output value $\bar{s}_1=\overline{YZ}\vee YZ$ from logic element 11. The output values from logic element 13 are then $$s_3=(\bar{X}\vee\bar{s}_1)\cdot(\bar{Y}\vee\bar{Z})=\overline{XY}\vee\overline{XZ}\vee\overline{YZ}$$

and $$\bar{s}_3=XY\vee XZ\vee YZ,$$

$\bar{s}_3$ being brought to output T.

The equation for output C of unit 15 is:

$$C=c(X\oplus Y\oplus Z)\vee(\overline{X\oplus Y\oplus Z})\ (XY\vee XZ\vee YZ).$$

The negated values of the first and of the second parenthetical terms are available at the outputs $s_2$ and $s_2$ of logic element 12 and that of the third parenthetical term at output $s_3$. These, as well as the negated value of the input value c, are correspondingly brought to logic element 15.

In detail, the logic description of the modular unit 1 is as follows:

| | | | |
|---|---|---|---|
| $e_1=Y$ | $f_1=Z$ | $g_1=\overline{Y}$ | $h_1=\overline{Z}$ |
| $e_2=s_1$ | $f_2=X$ | $g_2=\bar{s}_1$ | $h_2=\overline{X}$ |
| $e_3=\overline{X}$ | $f_3=\bar{s}_1$ | $g_3=\overline{Y}$ | $h_3=\overline{Z}$ |
| $e_4=s_2$ | $f_4=c$ | $g_4=\bar{s}_2$ | $h_4=\bar{c}$ |
| $e_5=\bar{c}$ | $f_5=\bar{s}_2$ | $g_5=s_2$ | $h_5=s_3$ |
| $R=s_2$ | $S=s_4$ | $T=\bar{s}_3$ | $C=\bar{s}_5$ |
| $\overline{R}=\bar{s}_2$ | $\overline{S}=\bar{s}_4$ | $\overline{T}=s_3$ | $\overline{C}=s_5$ |

The modular unit 1 created according to the present invention is distinguished by its minimum cost, which is made possible by its versatile utilization of the same logic elements, and it is also quite economical since it consists only of one type of logic element. In addition, the unit is characterized by a compact construction due in substantial part to the series connection of logic elements 11, 12 and 14, which is in turn made possible by the associative behavior of modulo-2 addition.

Circuits 2*a*, 2*b* and 2*c* are also each formed by one of the above-described known logic elements. The inputs *e* and *h* are used as control inputs and an input variable and its negated value are applied to inputs *f* and *g*, respectively. If one considers the appropriate logic input variable as LX, the following dependence of the output value of the logic elements on the control of inputs *e* and *h* results:

| e | h | s | $\bar{s}$ |
|---|---|---|---|
| 0 | 0 | 0 | 1 |
| 0 | 1 | LX | $\overline{LX}$ |
| 1 | 0 | $\overline{LX}$ | LX |
| 1 | 1 | 1 | 0 |

The outputs from the logic element thus have the values 0 and 1 or LX and $\overline{LX}$, depending on how they are controlled. For the logic element 2*a*, LX=X′, $\overline{X}'$. For the logic element 2*b*, LX=Y′, $\overline{Y}'$, and for the logic element 2*c*, LX=Z′, $\overline{Z}'$. The inputs *e*, *h* and *f*, *g* can be interchanged while retaining the above-mentioned functions.

The novel use of the logic elements as input control elements according to the present invention, i.e., as circuits 2*a*–2*c*, thus makes it possible to construct the entire unit 2 of one type of logic element so that unit 2 is distinguished by very low cost in addition to the earlier-listed functional advantages. It is particularly suited for utilization as a modular unit in monolithically integrated circuitry.

Figure 7:
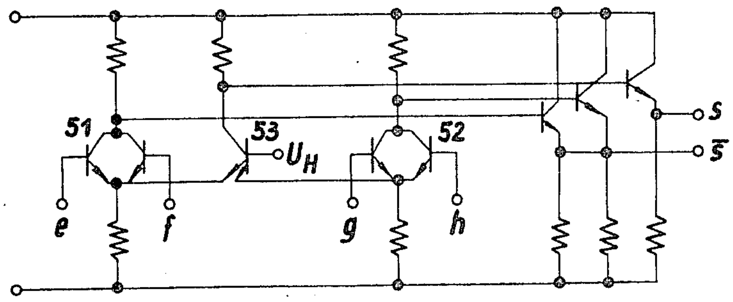
FIG. 7 is a circuit diagram of a basic logic element of the circuit of FIG. 6.

FIG. 7 shows a known embodiment (Motorola MECL) of the known logic element. The circuit consists of two transistorized sum-and-difference amplifiers 51 and 52, each of which receives two inputs and which together achieve the function $s=e\cdot f\ g\cdot h$, and of a multiple-emitter transistor 52 having a suitable operating voltage $U_H$ applied to its base to produce the function $s=(e\ f)\cdot(g\ h)$. An emitter follower stage is connected to each sum-and-difference amplifier as well as to the multiple-emitter transistor.

It will be understood that the above description of the present invention is susceptible to various modifications, changes and adaptations, and the same are intended to be comprehended within the meaning and range of equivalents of the appended claims.

We claim:

1. A modular circuit unit having four inputs X, Y, Z and *c* and corresponding negated inputs $\overline{X}$, $\overline{Y}$, $\overline{Z}$ and $\bar{c}$, and having four outputs, R, S, T and C and corresponding negated outputs $\overline{R}$, $\overline{S}$, $\overline{T}$ and $\overline{C}$, said unit comprising five identical logic elements each having four inputs *e*, *f*, *g* and *h* and two outputs *s* and $\bar{s}$, where $\bar{s}$ is the negated value of *s*, each said logic element constituting means for producing the following relationships:

$$s=(e\vee f)(g\vee h)$$

$$\bar{s}=(\overline{ef})\vee(\overline{gh})$$

said logic elements being connected to each other and to said inputs X, Y, Z and *c* and said outputs R, S, T and C, as well as to negated inputs $\overline{X}$, $\overline{Y}$, $\overline{Z}$ and $\bar{c}$ and negated outputs $\overline{R}$, $\overline{S}$, $\overline{T}$ and $\overline{C}$, in the following manner, wherein each subscript represents a respective logic element:

| | | | |
|---|---|---|---|
| $e_1=Y$ | $f_1=Z$ | $g_1=\overline{Y}$ | $h_1=\overline{Z}$ |
| $e_2=s_1$ | $f_2=X$ | $g_2=\bar{s}_1$ | $h_2=\overline{X}$ |
| $e_3=\overline{X}$ | $f_3=\bar{s}_1$ | $g_3=\overline{Y}$ | $h_3=\overline{Z}$ |
| $e_4=s_2$ | $f_4=c$ | $g_4=\bar{s}_2$ | $h_4=\bar{c}$ |
| $e_5=\bar{c}$ | $f_5=\bar{s}_2$ | $g_5=s_2$ | $h_5=s_3$ |
| $R=s_2$ | $S=s_4$ | $T=\bar{s}_3$ | $C=\bar{s}_5$ |
| $\overline{R}=\bar{s}_2$ | $\overline{S}=\bar{s}_4$ | $\overline{T}=s_3$ | $\overline{C}=s_5$ |

2. An arrangement as defined in claim 1 further comprising at least one input unit constituted by a logic element identical with each of said logic elements, said input unit having two outputs *s* and $\bar{s}$ which present one of the sets of inputs X, $\overline{X}$ or Y, $\overline{Y}$ or Z, $\overline{Z}$, said input unit further having a first pair of inputs *e* and *h* and a second pair of inputs *f* and *g*, said input *e* being connected to receive a binary information bit, said input *h* being connected to receive the negated value of such binary information bit, and said inputs *f* and *g* being connected to receive binary control signals whose values cause each of said outputs to present such binary information bit in direct or negated form or to present a binary value which is independent of the binary information bit.

3. An arrangement as defined in claim 1 further comprising at least one input unit having a signal input, a control input, and a signal output connected to provide one of said inputs X, Y and Z, said input unit being arranged to deliver to its said output either the binary signal appearing at its said signal input, directly or in negated form, or a binary "1" or "0," independent of the signal appearing at its said signal input, under the control of the signal applied to its said control input.

4. An arrangement as defined in claim 3 connected to act as an arithmetic circuit for the *i*th bit location of an *n*-bit arithmetic unit.

5. An arrangement as defined in claim 4 wherein there are *n* of said arithmetic circuits, the *i*th one of said circuits being associated with a respective *i*th bit location of said arithmetic unit.

6. An arrangement as defined in claim 5 wherein said arithmetic unit further comprises operand storage registers D, A, B, U and V each having *n*+1 bit locations, and each said logic unit is provided with three input units each connected to provide a respective one of said inputs X, Y and Z, the signal inputs to said input units being designated X′, y′ and z′, respectively, and wherein, for the *i*th arithmetic circuit:

said signal input X′ is connected to the *i*th bit location output of said storage register D;

said signal input Y′ is connected to the *i*th bit location output of said register A;

said signal input Z′ is connected to the *i*th bit location output of said register U;

said input *c* is connected to the output C of that one of said circuits provided for the next lower bit location (*i*−1) of said arithmetic unit;

said output R is connectable to the (*i*−1) th bit location input of said register B;

said output S is connectable to the *i*th bit location input of said register B; and said output T is connectable to the *i*th bit location input of said register V.

7. An arrangement as defined in claim 6 further comprising, in order to eliminate the need for transferring stored values from one of said registers to another during multistep arithmetic operations, switching means connected between said registers A,B, U and V and each said arithmetic circuit, said switching means being arranged for alternately connecting:

said output R of said *i*th arithmetic circuit to the (*i*−1)th bit location input of either said register B or said register A;

said output T or said *i*th arithmetic circuit to the *i*th bit location input of either said register V or said register U;

the Y′ input of said *i*th arithmetic circuit to the *i*th bit location output of either said register A or said register B; and the input Z′ of said *i*th arithmetic circuit to the *i*th bit location of either said register U or said register V; and wherein said switching means are controlled for causing each said register to be connected only to inputs or to outputs of said arithmetic circuits at any given time.